(12) United States Patent
Hietaranta et al.

(10) Patent No.: US 8,075,941 B2
(45) Date of Patent: Dec. 13, 2011

(54) METHOD AND ARRANGEMENT IN COATING LINE

(75) Inventors: Timo Hietaranta, Helsinki (FI); Jari Nykänen, Helsinki (FI)

(73) Assignee: Nextrom Oy, Vantaa (FI)

( * ) Notice: Subject to any disclaimer, the term of this patent is extended or adjusted under 35 U.S.C. 154(b) by 943 days.

(21) Appl. No.: 11/992,014

(22) PCT Filed: Sep. 23, 2005

(86) PCT No.: PCT/FI2005/050327
§ 371 (c)(1),
(2), (4) Date: Mar. 14, 2008

(87) PCT Pub. No.: WO2007/034023
PCT Pub. Date: Mar. 29, 2007

(65) Prior Publication Data
US 2009/0104341 A1    Apr. 23, 2009

(51) Int. Cl.
*B05D 7/00* (2006.01)
*B05C 9/06* (2006.01)
*B29C 47/00* (2006.01)

(52) U.S. Cl. ......... 427/8; 427/163.2; 427/154; 118/708; 425/113; 385/118

(58) Field of Classification Search ............... None
See application file for complete search history.

(56) References Cited

U.S. PATENT DOCUMENTS

| 3,701,512 A * | 10/1972 | Schippers et al. ........... 366/81 |
| 3,980,390 A | 9/1976 | Yamamoto et al. |
| 5,181,268 A | 1/1993 | Chien |
| 5,838,862 A | 11/1998 | Chien |
| 5,908,484 A | 6/1999 | Decker et al. |
| 5,938,987 A * | 8/1999 | Paivinen ..................... 264/1.28 |
| 2003/0108660 A1 | 6/2003 | Yuan |

FOREIGN PATENT DOCUMENTS

| FI | 20045309 A | 2/2006 |
| JP | A-2003-029048 | 1/2003 |
| WO | WO 02/075416 A1 | 9/2002 |

* cited by examiner

*Primary Examiner* — Michael Cleveland
*Assistant Examiner* — Francisco Tschen
(74) *Attorney, Agent, or Firm* — Oliff & Berridge, PLC

(57) ABSTRACT

The invention relates to a method and an arrangement in a coating line, in which a fibre (2) is uncoiled from a fibre start (1) by means of a pulling device (5) to an extrusion head (3) that comprises a die part (7) and a torpedo part, by means of which on the surface of a primary coated fibre there is arranged a buffer layer which is in tight contact with the primary coated fibre, and in which method the tightly coated fibre is cooled downstream of the extrusion head (3) in a predetermined manner. First there is determined a target value for line tension by means of the correlation between a line tension and a force required for stripping a buffer layer and the line tension between the extrusion head (3) and the pulling device (5) is measured. The obtained measurement data is compared with the target value to be obtained by means of the correlation between the line tension and the force required for stripping the buffer layer and the position of the die part (7) and/or the torpedo part of the extrusion head (3) is adjusted in the axial direction of the fibre such that the measurement value to be obtained from the line tension measurement attains the target value.

10 Claims, 2 Drawing Sheets

METHOD AND ARRANGEMENT IN COATING LINE

Figure 1:
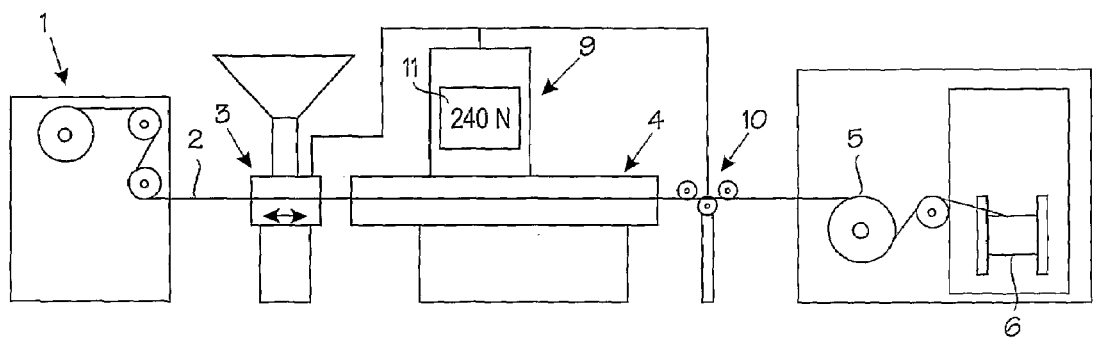

The invention relates to a method in a coating line, in which a fibre is uncoiled from a fibre start by means of a pulling device and is further applied to an extrusion head that comprises a die part and a torpedo part, by means of which on the surface of a primary coated fibre there is arranged a buffer layer which is in tight contact with the primary coated fibre, and in which method the tightly coated fibre is cooled downstream of the extrusion head in a predetermined manner. The invention also relates to an arrangement in the coating line.

The methods and arrangements of the above-described type are currently well known in connection with manufacture and processing of optical fibres. Because the optical fibres are relatively brittle in nature and their attenuation characteristics deteriorate considerably if they are subjected to various tensions, such as excessive tensile stress, bending or twisting, there are arranged buffer layers on the surface of a fibre provided with a primary coating in the fibre drawing process. The buffer layer may consist of a suitable plastic material that is fed in melt condition around the fibre. The buffer layer may run loosely around the fibre or it may be in immediate, tight contact with the fibre. The invention relates particularly to the structure, in which the buffer layer is in tight contact with a primary coated fibre. These structures are known in the field as "tight buffered fibres". U.S. Pat. Nos. 5,838,862, 5,181,268 and 3,980,390 can be given as examples of prior art.

Drawbacks in the prior art are associated with stripping the buffer layer arranged on the surface of the fibre. A force required for stripping the buffer layer varies depending on how the coating process of the fibre was performed. The stripping force can be controlled by shifting the extrusion head parts with respect to one another, the die part or the torpedo part in the direction of the fibre, in other words, by changing the melt pressure of the coating material at a point where the material constituting the buffer layer comes into contact with the fibre surface.

In the prior art the stripping force control has been performed off-line, in other words, test runs have been carried out to obtain various test samples that are measured after the test run. This poses a problem that online information is not available to control the stripping force, and in addition, material and time are wasted in the test runs, while preparations are made for the production run.

Previously the stripping force control has also been performed, for instance, by running the machine with particular settings and by measuring a test bit for the required stripping force. Next the extrusion head is adjusted for obtaining the desired end result, the machine is run with new settings, a new test bit is measured and so on. The above operations are repeated until the desired stripping force is achieved. The above process must be carried out every time the production is started. In addition, it should be noted that the implementation of the process is highly dependent on the operator's skills and the like. It is difficult to make the process repeatable, because the position of the extrusion head parts is very difficult to measure. A problem with this process is waste of material, because, depending on the operator's competence, there may be needed quite a large number of control rounds before the desired end result is achieved.

The object of the invention is to provide a method and an arrangement by means of which the drawbacks of the prior art can be eliminated. This is achieved by means of the method and the arrangement of the invention. The method of the invention is characterized by determining a target value for line tension by means of the correlation between a line tension and a force required for stripping a buffer layer; measuring the line tension between an extrusion head and a pulling device; comparing the obtained measurement data with the target value to be obtained by means of the correlation between the line tension and the force required for stripping the buffer layer; and adjusting the position of a die part and/or a torpedo part of the extrusion head in the axial direction of the fibre such that the measurement value to be obtained from the line tension measurement attains the target value. The arrangement of the invention, in turn, is characterized by comprising a control unit that is arranged to adjust the position of the die part and/or the torpedo part of the extrusion head in the axial direction of the fiber on the basis of the measurement data obtained from the means measuring the line tension and the target value obtained by means of the correlation between the known line tension and the force required for stripping the buffer layer.

The invention has an advantage that the control of the stripping force can advantageously be performed on-line, and consequently the difficult, repeated operations of the prior art are eliminated. A further advantage is that the disadvantageous waste of material occurring in connection with the prior art can be eliminated. Yet another advantage of the invention is that it can be applied in an advantageous manner in connection with the existing production lines, in other words, old production lines can be updated, so to say, by adding the arrangement of the invention thereto.

Figure 2:
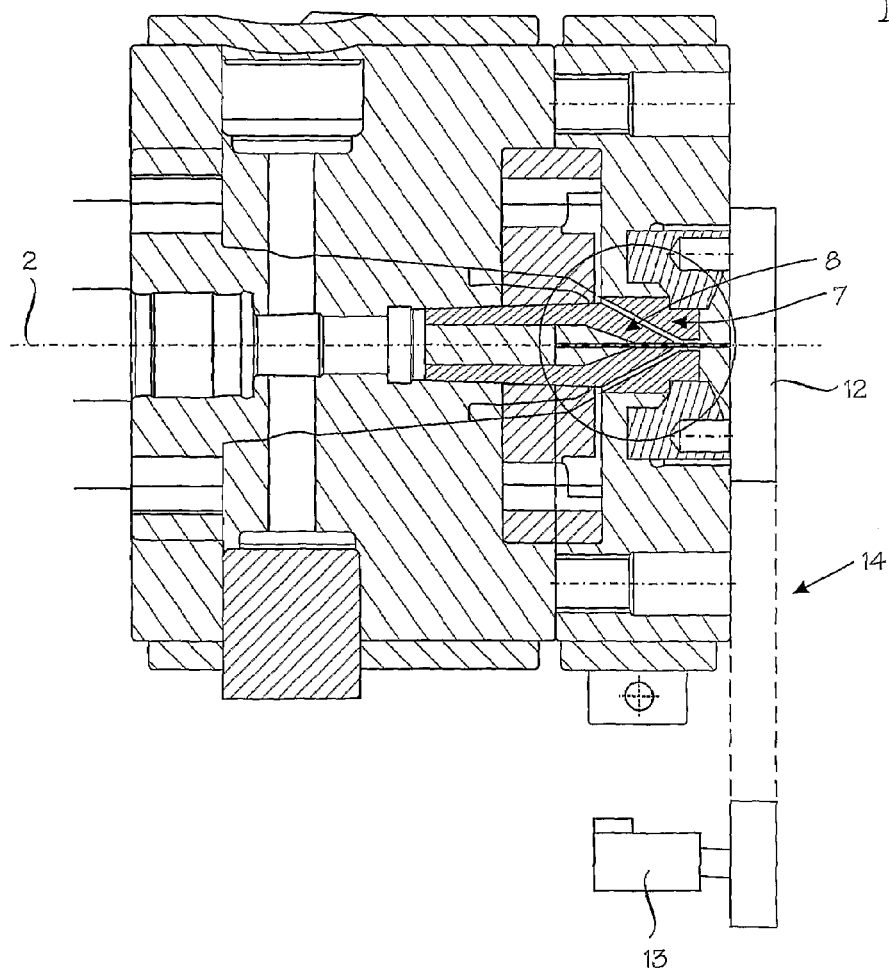
Figure 3:
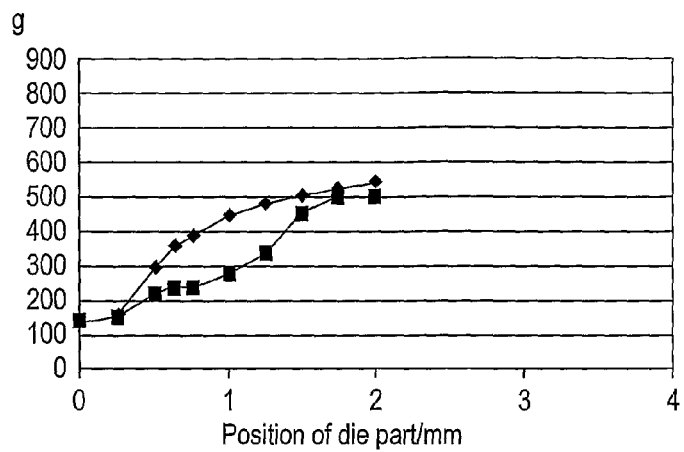
Figure 4:
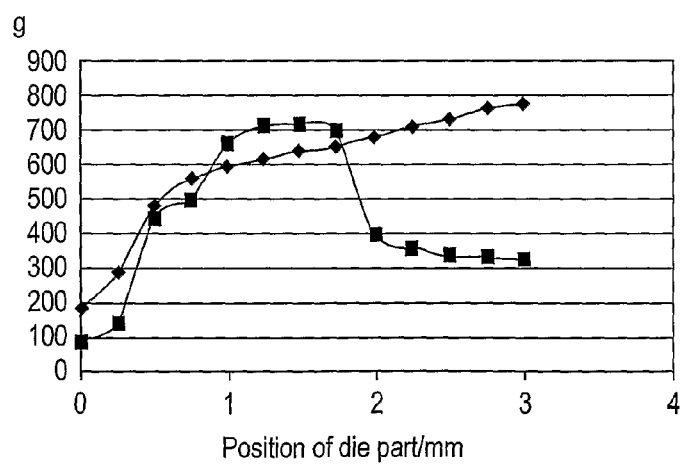
Figure 5:
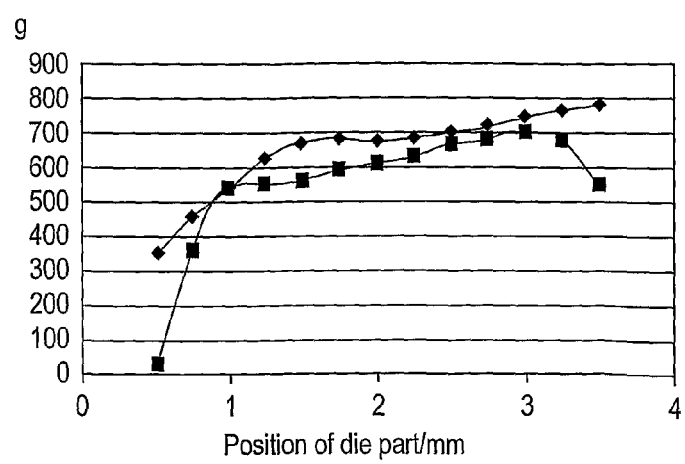

In the following the invention will be described in greater detail by means of an embodiment presented in the attached drawings, wherein FIG. 1 is a schematic side view of a coating line for an optical fibre, the line comprising an arrangement in accordance with the invention, FIG. 2 is a schematic side view of an embodiment of the arrangement in accordance with the invention; and FIGS. 3 to 5 depict correlations between the force required for stripping the coating and the position of a die part in various situations.

FIG. 1 shows schematically a coating line for an optical fibre, the line comprising an arrangement in accordance with the invention. The term "fibre" refers in this connection to a primary coated fibre. The primary coating of the fibre is generally provided in the early fibre drawing process. Reference numeral 1 denotes a fibre start, wherefrom a fibre 2 to be coated is guided to an extrusion head 3, by means of which a buffer layer, which is in tight contact with the surface of the primary coated fibre, is arranged on the surface of the fibre. Downstream of the extrusion head the coated fibre is guided to a cooling device 4, by means of which the coated fibre is cooled down in a desired, predetermined manner. The cooling device 4 may be a cooling chute, for instance. Reference numeral 5 in FIG. 1 denotes a pulling device, which may be a capstan-type device, for instance. Reference numeral 6 in FIG. 1 indicates schematically a coil onto which the tightly coated fibre is guided.

The above is fully conventional technology to a person skilled in the art, and therefore it is not described in greater detail in this connection.

FIG. 2 is a schematic view of an extrusion head 3. Reference numerals 7 and 8 in FIG. 2 denote a die part and a torpedo part of the extrusion head. The above parts are conventional extrusion head parts, the operation of which is known technology to a person skilled in the art. The fibre to be coated is indicated by reference numeral 2 as in FIG. 1. The fibre 2 runs through the torpedo part and the die part as shown in FIG. 2. The material forming a buffer layer, such as PVC, PA, HFFR or other suitable material, is fed through a channel part formed between the die part 7 and torpedo part 8 such that it spreads around the fibre and adheres tightly on the surface of the fibre.

In accordance with the basic idea of the invention it is assumed that there is a correlation between the line tension and the stripping force. It is known that when the distance between the die part and the torpedo part increases, the line tension increases as well. In addition it is possible to determine the force required for stripping the coating from products that have been run with different distances between the die part and the torpedo part. FIG. 3 shows one example of the above-mentioned correlation. The example of FIG. 3 is measured at the line speed of 200 m/min. The running speed also affects the above-mentioned dependences. FIGS. 4 and 5 show the results obtained from the product of FIG. 3 being run at the speed of 400 m/min (FIG. 4) and 600 m/min (FIG. 5) respectively. It is also necessary to determine specific correlations for various fibre/buffer materials.

A target value for line tension is determined by means of the above correlation. The target value is different in different cases depending on the above-described details, such as running speed, materials, etc. It is also substantial that the invention measures the line tension between the extrusion head 3 and the pulling device 5. The measurement may be carried out with means 10. Then the obtained measurement data is compared with the target value and the position of the die part 7 and/or the torpedo part 8 of the extrusion head 3 is adjusted in the travel direction of the fibre such that the measurement value to be obtained from the line tension measurement will attain the target value. An arrangement for measuring a line tension comprises a control unit 9, which is arranged to adjust the position of the die part 7 and/or the torpedo part 8 of the extrusion head in the axial direction of the fibre on the basis of the measurement data obtained from the means 10 measuring the line tension and the target value obtained by means of the correlation between the known line tension and the stripping force. The position of the die part 7 and/or the torpedo part 8 is thus adjusted such that the line tension will attain the target value as determined above, whereby the force required for stripping the product will also be at the desired value. The axial direction of the fibre refers to the travel direction of the fibre or the direction opposite to the travel direction.

The control unit 9 can advantageously be provided with a memory means, which enables target values for various situations to be entered in the memory. The control unit may also comprise a display means 11 to display the measurement data obtained from the means 10 measuring the line tension, for instance. The target value and other optional data may also be displayed on the above-mentioned display means 11.

The adjustment of the extrusion head 3 can be implemented in a variety of ways. FIG. 2 shows schematically one implementation. In connection with the extrusion head 3 it is possible to arrange a rim part 12, whose rotating motion is arranged by means of helical coil transmission, for instance, to be transmitted to the die part 7 and/or the torpedo part 8. It is possible to arrange the rim part 12 for being rotated by means of a power source 13 and a power transmission mechanism 14. For instance, the rim part 12 may be a cogwheel and the transmission mechanism may comprise a cogged belt, for instance. The power source may be an electric motor, for instance. Instead of the cogwheel/cogged belt mechanism it is possible to use a pinion/chain mechanism, etc.

In the example of FIG. 2 the rim part 12 is arranged in the die part 7, whereby the die part 7 is provided to be a movable part. Just as well the torpedo part 8 can be provided to be the movable part. It is also possible to provide a construction where both the die part 7 and the torpedo part 8 are movable parts.

The position adjustment of the extrusion head 3 parts can also be implemented by means of a cylinder, a pneumatic cylinder, a linear motor, a thermally expansive actuator or another suitable mechanism.

The above-described embodiment is not to restrict the invention in any way, but the invention may be modified freely within the scope of the claims. Hence, it is apparent that the arrangement of the invention or the details thereof need not be exactly those appearing in the figures, but other solutions are also possible.

The invention claimed is:

1. A method in a coating line, in which a fibre is uncoiled from a fibre start by means of a pulling device to an extrusion head that comprises a die part and a torpedo part, by means of which on the surface of a primary coated fibre there is arranged a buffer layer which is in tight contact with the primary coated fibre, and in which method the tightly coated fibre is cooled downstream of the extrusion head in a predetermined manner, the method comprising the following steps:

determining a target value for line tension by means of the correlation between a line tension and a force required for stripping the buffer layer; measuring the line tension between the extrusion head and the pulling device;

comparing the obtained measurement data with the target value to be obtained by means of the correlation between the line tension and the force required for stripping the buffer layer; and adjusting the position of the die part and/or the torpedo part of the extrusion head in the axial direction of the fibre such that the measurement value to be obtained from the line tension measurement attains the target value.

2. A method as claimed in claim 1, wherein the correlation between the line tension and the stripping force is determined for different fibre/buffer materials and combinations thereof and/or for different running speeds on the line.

3. A method as claimed in claim 2, wherein the correlation between the line tension and the stripping force is stored in a memory.

4. A method as claimed in claim 1, wherein the correlation between the line tension and the stripping force is stored in a memory.

5. An arrangement in a coating line, in which a fibre is arranged for being uncoiled from a fibre start by means of a pulling device to an extrusion head that comprises a die part and a torpedo part, which are arranged to apply a buffer layer on the surface of a primary coated fibre, which buffer layer is in tight contact with the primary coated fibre, and in which production line the tightly coated fibre is arranged for being cooled downstream of the extrusion head in a predetermined manner and which production line comprises means for measuring the line tension between the extrusion head and the pulling means, the arrangement further comprising a control unit that is arranged to adjust the position of the die part and/or the torpedo part of the extrusion head in the axial direction of the fibre on the basis of the measurement data obtained from the means measuring the line tension and the target value obtained by means of the correlation between the known line tension and the stripping force.

6. An arrangement as claimed in claim 5, wherein the control unit comprises a memory means for storing various target values.

7. An arrangement as claimed in claim 6, wherein the control unit comprises a display means for displaying the measurement data to be obtained from the means measuring the line tension.

8. An arrangement as claimed in claim 5, wherein the control unit comprises a display means for displaying the measurement data to be obtained from the means measuring the line tension.

9. An arrangement as claimed in claim 5, wherein in connection with the extrusion head there is arranged a rim part whose rotating motion is arranged for being transmitted by means of helical coil transmission to the die part and/or the torpedo part and that the rim part is arranged for being rotated by a power source and a power transmission mechanism.

10. An arrangement as claimed in claim 9, wherein the rim part is a tooth-wheel rim, the power transmission mechanism is a cogged belt or a chain and the power source is an electric motor.

* * * * *